(12) United States Patent
Lee et al.

(10) Patent No.: US 9,152,884 B2
(45) Date of Patent: Oct. 6, 2015

(54) TEACHABLE PATTERN SCORING METHOD

(75) Inventors: Shih-Jong J. Lee, Bellevue, WA (US); Chi-Chou Huang, Redmond, WA (US)

(73) Assignee: DRVision Technologies LLC, Bellevue, WA (US)

( * ) Notice: Subject to any disclaimer, the term of this patent is extended or adjusted under 35 U.S.C. 154(b) by 67 days.

(21) Appl. No.: 13/507,115

(22) Filed: Jun. 5, 2012

(65) Prior Publication Data

US 2013/0322741 A1 Dec. 5, 2013

(51) Int. Cl.
*G06K 9/62* (2006.01)
*G06K 9/00* (2006.01)

(52) U.S. Cl.
CPC ............ *G06K 9/6256* (2013.01); *G06K 9/0014* (2013.01); *G06K 9/00147* (2013.01); *G06K 9/6272* (2013.01); *G06K 9/62* (2013.01)

(58) Field of Classification Search
USPC .......... 382/155, 159, 171, 173, 180, 224, 240
See application file for complete search history.

(56) References Cited

U.S. PATENT DOCUMENTS

| | | | |
|---|---|---|---|
| 6,963,425 B1 * | 11/2005 | Nair et al. ...................... 358/1.9 |
| 7,031,948 B2 | 4/2006 | Lee |
| 7,035,467 B2 * | 4/2006 | Nicponski ...................... 382/224 |
| 7,203,360 B2 | 4/2007 | Lee et al. |
| 7,233,931 B2 | 6/2007 | Lee et al. |
| 7,953,246 B1 * | 5/2011 | Tu et al. ........................ 382/103 |
| 8,478,052 B1 * | 7/2013 | Yee et al. ...................... 382/224 |
| 8,565,859 B2 * | 10/2013 | Wang et al. ................... 600/427 |
| 2001/0000025 A1 * | 3/2001 | Darrell et al. ................. 382/103 |
| 2007/0076957 A1 * | 4/2007 | Wang et al. ................... 382/195 |
| 2008/0123940 A1 * | 5/2008 | Kundu et al. ................. 382/159 |
| 2010/0092075 A1 * | 4/2010 | Lee et al. ...................... 382/159 |
| 2011/0007366 A1 * | 1/2011 | Sarkar et al. .................. 358/462 |

OTHER PUBLICATIONS

Kari Torkkola, "Feature Extraction by Non-Parametric Mutual Information Maximization", Journal of Machine Learning Research 3 (2003) 1415-1438.

* cited by examiner

*Primary Examiner* — Vu Le
*Assistant Examiner* — Aklilu Woldemariam

(57) ABSTRACT

A computerized teachable pattern scoring method receives a teaching image and region pattern labels. A region segmentation is performed using the teaching image to generate regions of interest output. A feature measurement is performed using the teaching image and the regions of interest to generate region features output. A pattern score learning is performed using the region features and the region pattern labels to generate pattern score recipe output. A computerized region classification method using the region features and the pattern score recipe to generate pattern scores output. A region classification is performed using the pattern scores and region features to generate region class output.

15 Claims, 6 Drawing Sheets

TEACHABLE PATTERN SCORING METHOD

GOVERNMENT INTERESTS

Statement as to Rights to Inventions Made Under Federally Sponsored Research and Development This work was supported by U.S. Government grant numbers 1R44HL106863-01, awarded by the National Heart, Lung, and Blood Institutes. The U.S. Government may have certain rights in the invention.

TECHNICAL FIELD

This invention relates to the biology image recognition and the pattern guided feature extraction step.

BACKGROUND OF THE INVENTION

Computerized biology image recognition, the computer characterization of regions containing biological objects such as colonies in cell cultures of induced pluripotent stem cells or embryonic stem cells, individual cells and cellular and sub-cellular components, bacteria, viruses of interest, etc. in microscopy digital images, is a fundamental step in quantitative microscopy.

A typical computerized biology image recognition process consists of three major steps (1) a region segmentation step detects the regions of interest from an image; (2) a feature measurement step extracts (measures) features (measurements) from the regions of interest and (3) a classification step uses features to classify the regions of interest into different types. The computerized biology image recognition allows automated or semi-automated biological object recognition and typing. This enables studies of population statistics and image cytometry. It has broad applications in basic research, cancer research, toxicology and drug discoveries.

Currently, most users perform computerized biology image recognition using standard image processing software (such as Zeiss' AxioVision, Nikon's NIS-Elements, Olympus cellSens, ImageJ, Metamorph, ImagePro, Slidebook, Imaris, Volocity etc.), custom scripts/programming, or by hand. However, it is difficult to apply standard image processing software functions to perform biology image recognition. As a result the majority of biology recognition is performed either manually or using a simple intensity threshold followed by simple measurements and gating that has very limited applications. Some software supports plug-ins. Yet plug-ins developed in one lab for image recognition rarely work for the application of a second lab. The users have to modify the algorithm parameters, or even the code itself. Computerized biology image recognition products have been developed for high content screening applications. However, they are coupled to specific instrument platforms, cell types, and reagents. They are not flexible for broad applications.

The current immature microscopy biology recognition tools impose cost barriers on scientists and the image based scientific discovery process. The cost in skilled labor for manual recognition and custom script development is high. A greater cost is that of experiments foregone, or data uncollected, due to problems related to image recognition.

There are a large set of features such as size, shape, intensity and texture measurements that can be extracted from each segmented object for pattern classification. However, many of them are raw measurements. For example the Fourier Descriptors (FD) provide a set of raw coefficients (features) that represent different curvature components of a shape. However, complicated shapes cannot be discriminated by a few dominating features. They are best characterized by certain combinations of multiple features. It is difficult for human to determine the appropriate feature combinations for best characterization. A pattern recognition tool could automatically generate feature combinations by discriminate analysis. However, it is difficult for human to understand or control/adjust the automatically generated feature combinations.

OBJECTS AND ADVANTAGES

The current invention allows users to teach different types of patterns for feature combination using teach by example approach. User can flexibly define basic pattern types that are meaningful and/or they could identify visually. The teachable pattern scoring method of the current invention will automatically generate pattern scores from the teaching examples using a combination of raw features. The pattern scores for an object represent the similarity of the object pattern to taught patterns. Therefore, user can easily evaluate pattern scores by their similarity judgment when viewing images. In this way, user could identify scoring errors and could improve the pattern scoring by error correction teaching.

Many raw features can be selected for use with the teachable feature combination. The pattern scores can be used along with other features (size, shape, intensity, texture, etc.) for pattern classification.

The primary objective of the invention is to provide teachable pattern scoring method that combines features into scores of user taught patterns. The second objective of this invention is to provide meaningful feature combinations that users can evaluate and update. The third objective of the invention is to allow the flexible specification of user desired patterns. The fourth objective of the invention is to support the creation of pattern classifiers with understandable classification rules based on pattern scores.

SUMMARY OF THE INVENTION

A computerized teachable pattern scoring method receives a teaching image and region pattern labels. A region segmentation is performed using the teaching image to generate regions of interest output. A feature measurement is performed using the teaching image and the regions of interest to generate region features output. A pattern score learning is performed using the region features and the region pattern labels to generate pattern score recipe output. A computerized region classification method based on teachable pattern scoring receives at least one application image and pattern score recipe. A region segmentation is performed using the application image to generate regions of interest output. A feature measurement is performed using the application image and the regions of interest to generate region features output. A pattern scoring is performed using the region features and the pattern score recipe to generate pattern scores output. A region classification is performed using the pattern scores and region features to generate region class output.

BRIEF DESCRIPTION OF THE DRAWINGS

The preferred embodiment and other aspects of the invention will become apparent from the following detailed description of the invention when read in conjunction with the accompanying drawings, which are provided for the purpose of describing embodiments of the invention and not for limiting same, in which.

DETAILED DESCRIPTION OF THE INVENTION

I. Application Scenarios

Figure 1:
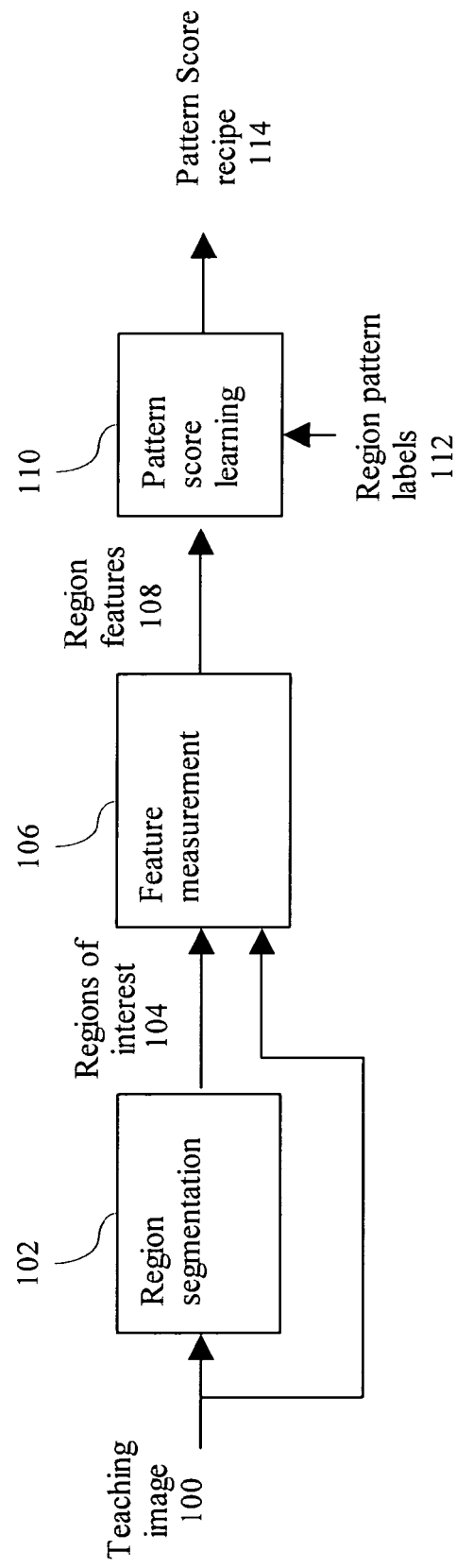
FIG. 1 shows the processing flow for the teaching phase of the teachable pattern scoring method in one embodiment of the application scenario.
Figure 2:
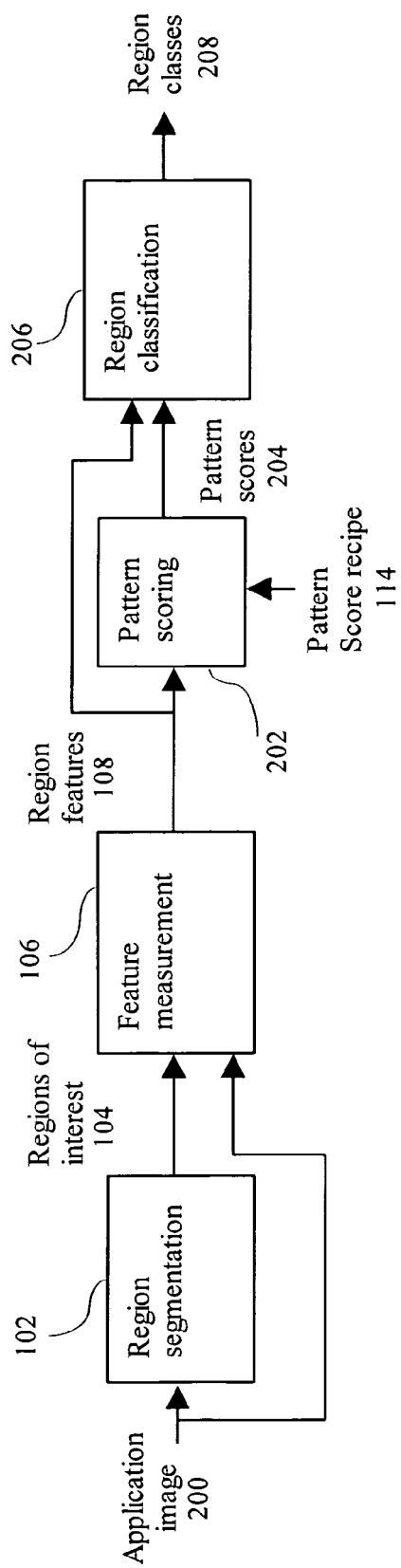
FIG. 2 shows the processing flow for the application phase of the teachable pattern scoring method in one embodiment of the application scenario.

The application scenario of the teachable pattern scoring method is shown in FIGS. 1 and 2. It consists of a teaching phase (FIG. 1) and an application phase (FIG. 2). As shown in FIG. 1, the teaching phase inputs at least one teaching image 100. It performs a region segmentation step 102 to detect at least one regions of interest 104 from the teaching image 100. A feature measurement step 106 measures features from regions of interest 104 to generate at least one region features 108. A pattern score learning step 110 inputs region features 108 and region pattern labels 112 that are entered from teaching and creates pattern score recipe 114. The pattern score recipe 114 contains the instructions for a computer to perform pattern scoring method 202 on region features 108 to generate pattern scores 204 during the application phase. The pattern scores 204 for an object region represent the similarity of the object pattern to taught patterns.

As shown in FIG. 2, the application phase inputs at least one application image 200. It performs a region segmentation step 102 to detect at least one regions of interest 104 from the application image 200. A feature measurement step 106 measures features from regions of interest 104 to generate at least one region features 108. A pattern scoring step 202 inputs region features 108 and pattern score recipe 114 to generate pattern scores 204. The pattern scores 204 along with the region features 108 are processed by a region classification step 206 to output region classes 208 for the regions of interest 104.

Figure 3:
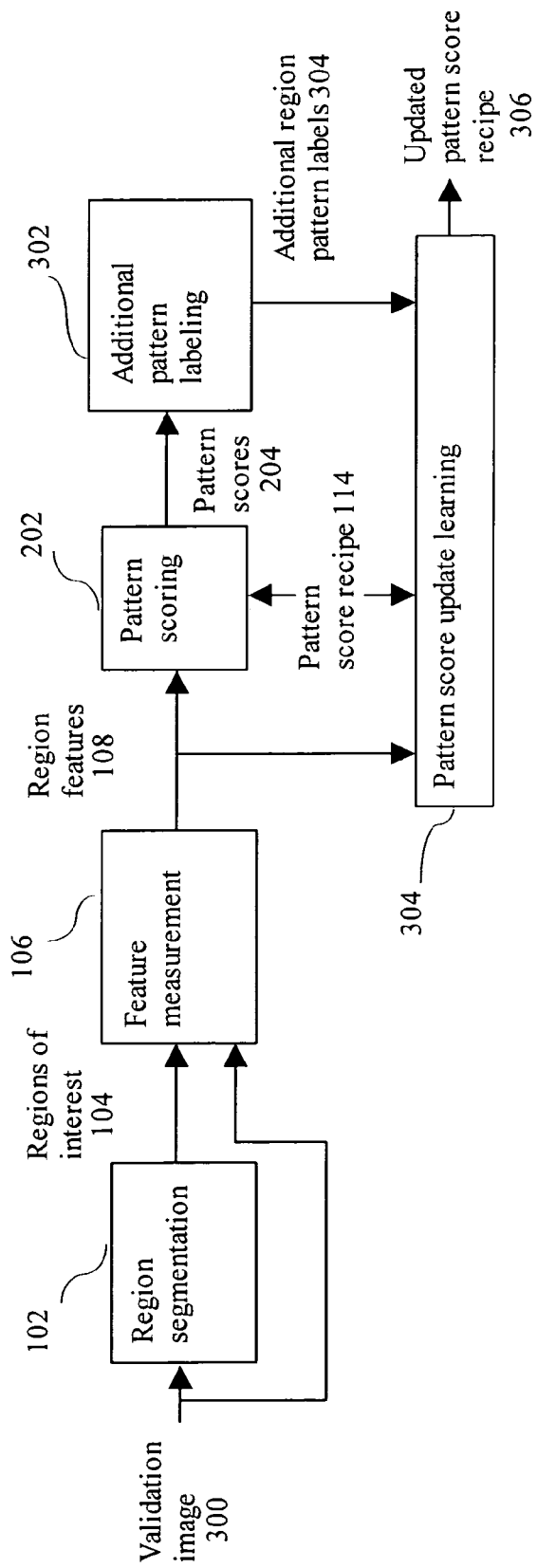
FIG. 3 shows the processing flow for the teaching phase of the teachable pattern 110 scoring method including update teaching in an alternative embodiment of the application scenario.

An alternative embodiment of the teaching phase of the teachable pattern scoring method including update teaching is shown in FIG. 3. Under this embodiment, at least one validation image 300 is processed to assess the resulting pattern scores 204 after applying the current pattern score recipe 114. The validation image 300 should be different from the initial teaching image 100 or contain new teaching regions of the same image. This creates at least one new regions of interest 104 and at least one region features 108 from the validation image 300. The region features 108 are processed by the pattern scoring step 202 using the current pattern score recipe 114 to generate pattern scores 204 for the regions of interest 104. The pattern scores 204 for the validation image regions of interest 104 may contain erroneous pattern scores 204 that do not reflect the taught region patterns. This is corrected by an additional pattern labeling step 302 to generate additional region pattern labels 304 that may include representative regions with erroneous pattern scores. The additional region pattern labels 304, their region features 108 and the original (current) pattern score recipe 114 are used by an pattern score update learning step 304 to generate an updated pattern score recipe 306. The update teaching process could be applied multiple times on the same or a different validation image 300 in an iterative fashion to update previous version of the pattern score recipe 114 yielding the updated pattern score recipe 306 in the current iteration.

Note that the teaching phase only needs to be performed once and the taught recipe can be applied multiple times for new images during the application phase. In a preferred embodiment of the invention, the above application scenarios are implemented by a computer and the data are stored in computer memory or disks.

II. Region Segmentation and Feature Measurement

The region segmentation 102 and feature measurement 106 are the pre-processing steps for both teaching and application phases of the teachable pattern scoring method.

II.1 Region Segmentation

Region segmentation step 102 inputs at least one images (100, 200, 300) and outputs regions of interest 104. It processes images containing objects and determines the 175 regions of interest in the images corresponding to those objects. Region segmentation is the key to follow on processing in any imaging applications. If segmented object regions are incorrect, the measurements performed on the segmented objects will certainly be incorrect and therefore any analysis and conclusion drawn based on the incorrect measurements will be erroneous and compromised.

For simple applications, image thresholding is the standard method for region segmentation. This works on images containing bright objects against dark background or dark objects against bright background. This region segmentation method amounts to determining a suitable threshold value to separate objects from background. For images with multiple object types with high object boundary contrast, edge detection methods are often used for object segmentation. In a preferred embodiment of the invention, a versatile region segmentation method that can be trained to automatically perform region segmentation for almost all image processing applications is used (See Lee JSJ, et. al., Learnable object segmentation, U.S. Pat. No. 7,203,360, Apr. 10, 2007).

II.2 Feature Measurement

The feature measurement step 106 processes the at least one input image (100, 200, 300) and the segmented regions of interest 104 to generate a set of features for each region of interest. There are many feature measurements available from prior art including morphological features, intensity features, texture and contextual features, etc.

A. Morphological Features

Morphological features characterize region position, size, shape, etc. Typical position features include centroid and bounding boxes. Typical size features include area, perimeter, major and minor axis lengths of fitting ellipse etc. There are many region shape features include compactness (perimeters$^2$/area), aspect ratio (major_axis/minor_axis), roundness ($4*area/\pi*major\_axis^2$), solidity (area/convex area) 205 and region boundary Fourier descriptors (coefficients representing different curvature components of a shape), etc.

Those ordinary skilled in the art should recognize that other morphological features could be used and they are all within the scope of this invention.

B. Intensity Features

The features are derived from the grayscale intensity of an image. In addition to the original grayscale intensity, a pixel neighborhood (such as 3×3, 5×5, 7×7 etc.) can be defined. The grayscale intensity statistics such as mean, standard deviation, skewness, kurtosis and other statistics can be derived from the neighborhood. Moreover, pre-processing of the grayscale intensity can be performed before gathering the statistics. The pre-processing includes point operations such as logarithm conversion for optical density measurement or filtering such as edge enhancement by linear or morphological gradient operator that includes dark edge, bright edge, and general edge enhancement, etc.

When the input image is a color image, color transformation may be applied to convert the color image into multi-bands of grayscale images. In one embodiment of the invention, the multiple bands includes the following images: R (Red channel), G (Green channel), B (Blue channel), (R−G)/(R+G), R/(R+G+B), G/(R+G+B), B/(R+G+B), R/G, R/B, G/B, G/R, B/G, B/R, or hue, saturation, intensity (HSI), etc.

The intensity space features with and without pre-processing can be generated for each band of the image. Those ordinary skilled in the art should recognize that other feature spaces such as temporal space or different focal planes could be used and they are all within the scope of this invention.

Those ordinary skilled in the art should also recognize that other intensity features could be used and they are all within the scope of this invention.

C. Texture and Contextual Features

Texture features characterize the spatial dependency of the grayscale intensities in neighbors around each pixel. Typical texture features include co-occurrence matrices based features such as moment, contrast, correlation, entropy, energy, inertia, etc.; run-length based features; Laws texture energy measures, and autocorrelation and power spectrum based features, etc.

Contextual features characterize the spatial dependency of the grayscale intensities around a region and its surrounding neighbors. Typical contextual features include the contrast of region of inside and outside edges of the region. The contrast can be measured with all different intensity or texture features. The contrast can be measured using ratio or difference measurements.

Those ordinary skilled in the art should recognize that other texture and contextual features such as Gabor filtering or wavelet based features could be used and they are all within the scope of this invention.

III. Pattern Score Learning

Figure 4:
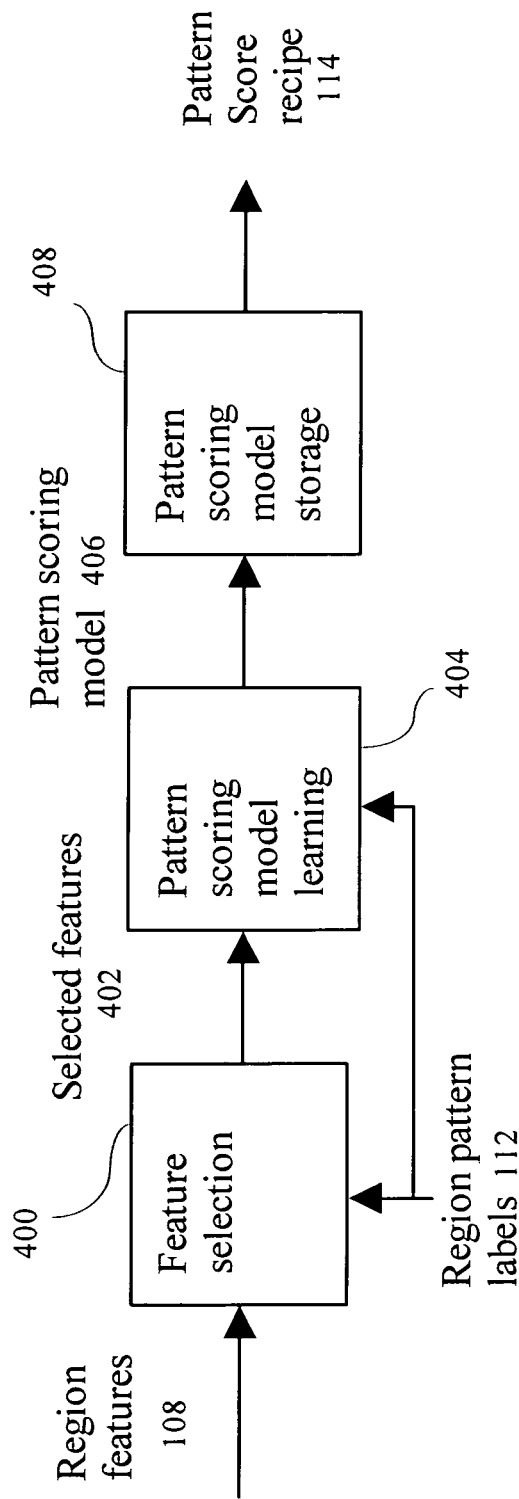
FIG. 4 shows the processing flow for the pattern score learning method in one embodiment of the invention.

The pattern score learning step 110 is the essential process during the teaching phase. It consists of an optional feature selection step 400, a pattern scoring model learning step 404 and a pattern scoring model storage step 408 as shown in FIG. 4.

III.1 Region Pattern Labels

Figure 5:
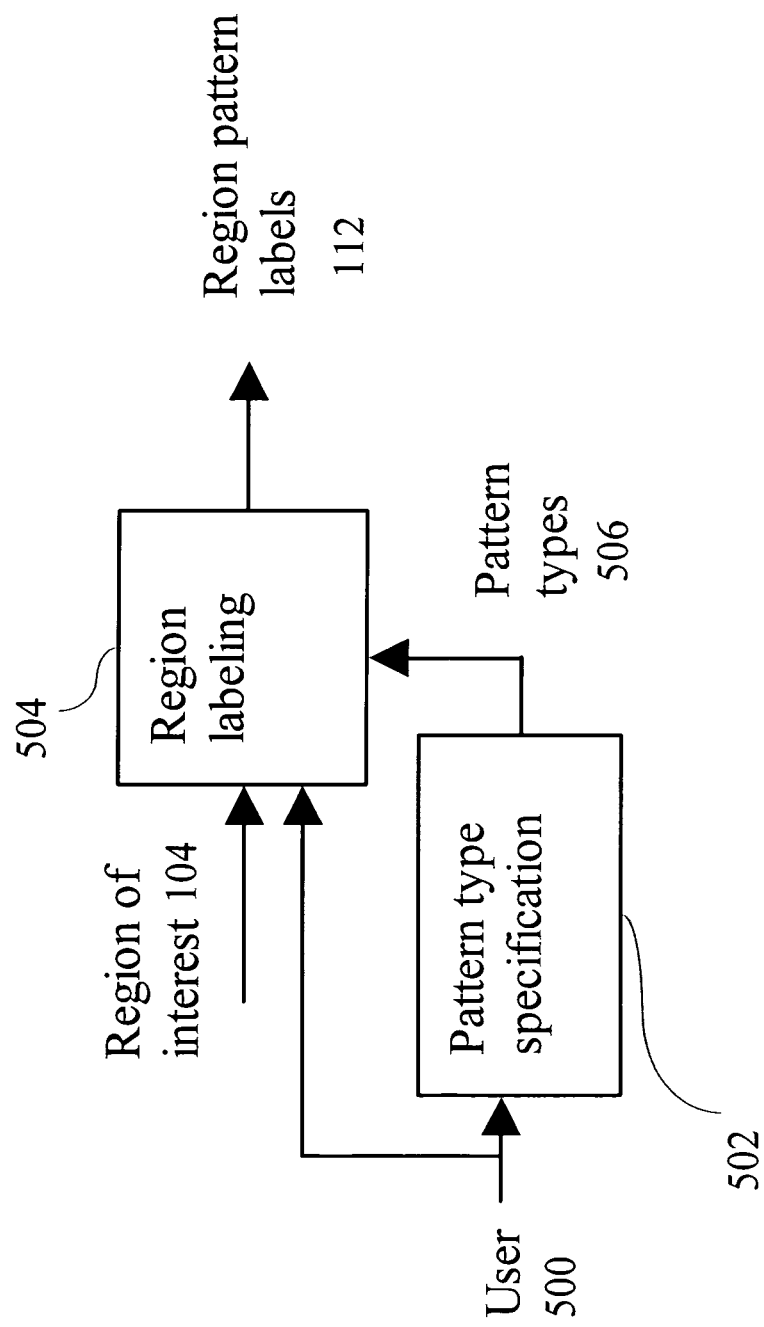
FIG. 5 shows the processing flow for the region pattern labels creation method in one 115 embodiment of the invention.

In one embodiment of the invention, the region pattern labels 112 input is created by entering pattern types 506 and label selected regions with the types. This could be performed by user 500 when viewing the teaching image from a computer display. FIG. 5 shows the processing flow for creating region pattern labels 112. A pattern type specification step 502 allows the flexibly specification of pattern types 506 by a user 500. For example, in a stem cell application, the region types could be 'normal shape colony', 'irregular shape colony', 'artifact', etc. In one embodiment of the invention, the pattern types 506 are specified by a user 500 from a computer GUI (Graphical User Interface) display. Some of the regions of interest 104 can then be associated with pattern types 506 by a region labeling step 504. In this way, typical regions for each of the pattern types 506 can be labeled. In one embodiment of the invention, the region labeling step 504 is conducted using a computer GUI display where regions of interest are 104 displayed and a user 500 can perform labeling by a simple clicking at the object to be 275 labeled. The output of the region labeling step 504 is the region pattern labels 112 to be used for pattern score learning 110.

III.2 Feature Selection

If region features include a large number of features, the pattern scoring performance 280 could degrade in the presence of irrelevant or redundant features. In one embodiment of the invention, a feature selection step 400 is applied before the pattern scoring model learning step 404.

Feature selection 400 method selects a subset of features that could discriminate between regions of different pattern types 506. Feature selection reduces the dimensionality of the data to be processed by the scoring method that could reduce execution time and improve predictive accuracy.

In one embodiment of the invention, the CFS (Correlation-based Feature Selection) can 290 be used for feature selection. The CFS algorithm is based on the following hypothesis: a good feature subset is one that contains features highly correlated with (predictive of) the class, yet uncorrelated with (not predictive of) each other. Other feature selection method such as Branch and bound method, sequential forward selection method, sequential backward selection method could also be used. In a hierarchical scoring method, the feature selection can be performed by Lee JSJ, et. al., Feature regulation for hierarchical decision learning, U.S. Pat. No. 7,233,931, Jun. 19, 2007.

Those ordinary skilled in the art should recognize that other feature selection methods could be used and they are all within the scope of this invention.

III.3 Pattern Scoring Model Learning

Given a set of labeled (by pattern types) region features (selected 402 or un-selected 108) for learning, the pattern scoring method 202 generates pattern scores 204 using a combination of features through a pattern scoring model 406. The pattern scores 204 for an object represent the similarity of the object pattern to taught pattern types 506.

To perform pattern scoring, a pattern scoring model 406 is first defined. The learning process will then determine parameters of the model based on the learning data.

Figure 6:
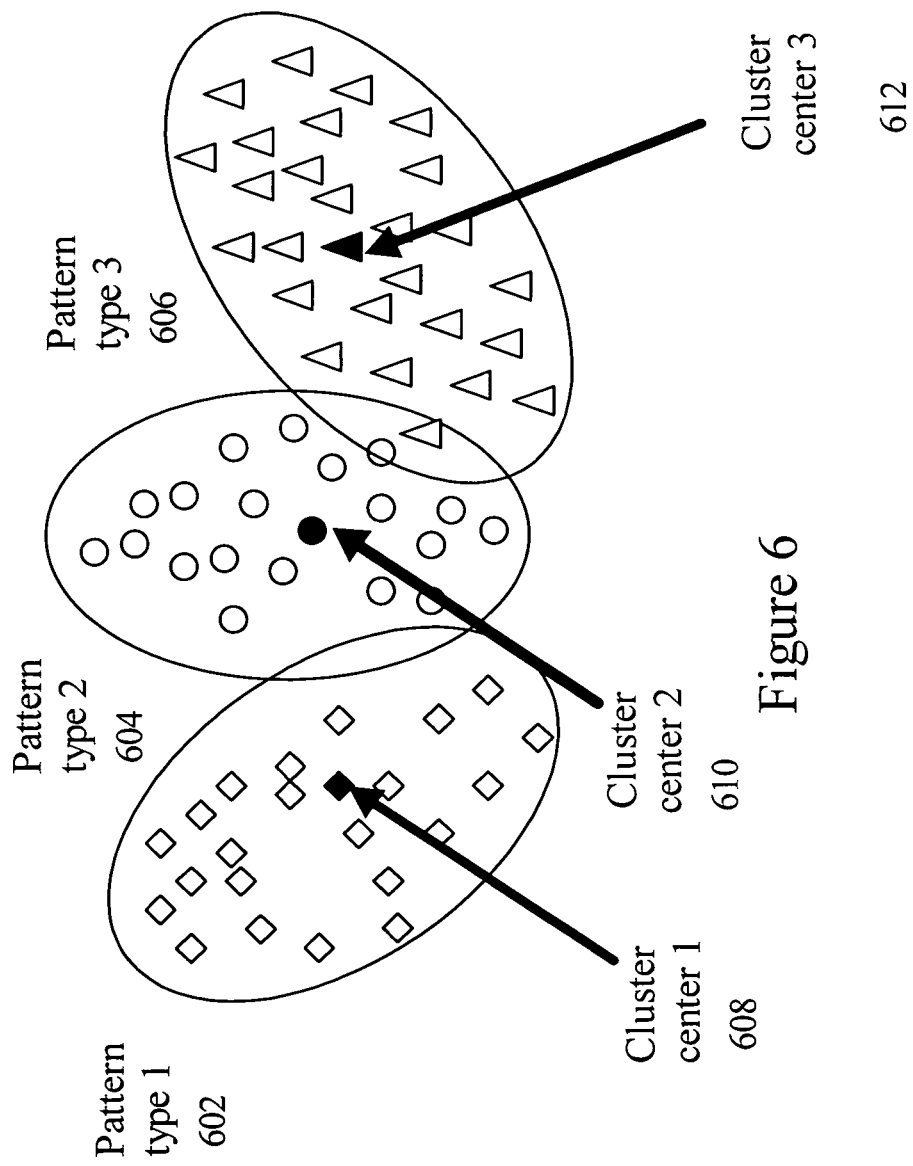
FIG. 6 shows the distributions of three pattern types and their cluster centers in the illustration of the distance to center model in two-dimensional space.

In one embodiment of the invention, a distance to center model is used for pattern scoring 202. FIG. 6 illustrates the distance to center model in two-dimensional space where the distributions of three pattern types (602, 604 and 606) and their cluster centers (608, 610 and 612) are shown. The samples from different pattern types are illustrated by different shapes (diamonds vs. circles vs. triangles). The cluster centers (608, 610 and 612) are illustrated by solid (dark) point of their corresponding shapes. This method can be directly generalized into N-dimensional space where N is the number of region features used for learning. The pattern scoring model learning 404 process determines the cluster centers of each pattern type from the N-dimensional feature space. To determine cluster center for scoring determination, a distance metric is needed. In one embodiment of the invention, an Euclidean distance is used. In another embodiment of the invention, the Mahalanobis distance is used. The Mahalanobis distance differs from Euclidean distance in that it takes into account the correlations of the data set and is scale-invariant.

In one embodiment of the invention, the pattern score for a given sample F can be calculated by the following rule:

$$\text{Pattern\_score}_i(F) = \frac{1 - Dist_i(F)}{\sum_{k=1}^{M} Dist_i(F)}$$

Where Pattern_Score$_i$(F) is the pattern score for pattern type i and Dist$_i$(F) is the distance metric value of the sample F to pattern type i. In the distance to center model, 330 the Dist$_i$(F) can be calculated as the distance between sample F and the cluster center of the pattern type i.

An alternative embodiment of the pattern scoring model 406 includes multiple cluster centers for each pattern type ("multiple cluster centers model"). The multiple cluster centers can be determined by first dividing each pattern type into multiple clusters. This can be done by clustering methods such as hierarchical clustering, k-means clustering, fuzzy clustering etc. Each of the multiple cluster centers can be determined as the center of each of the multiple clusters. In the multiple cluster center model, the distance Dist$_i$ (F) is determined as $$Dist_i(F) = \text{Min}_{k=1}^{P} Dist_{i,k}(F)$$

Where p is the number of clusters for pattern type i and Dist$_{i,k}$ (F) is the distance between sample F and the cluster center k of the pattern type i.

A kernel based model could be used as the pattern scoring model 406 in another embodiment of the invention where a pattern type is represented by multiple kernels and the score of a sample is the summation of all kernel values through a base distribution (such as Gaussian). Parzen windows method is a typical kernel based model.

Those ordinary skilled in the art should recognize that other pattern scoring model 406 such as nearest neighbor or decision tree models could be used and they are all within the scope of this invention.

III.3 Pattern Scoring Model Storage

To create pattern score recipe 114, the parameters learned for pattern scoring model 406 have to be stored into a computer file that can be loaded and applied during the application phase. This is accomplished by the pattern scoring model storage step 408. The parameters to be stored include the cluster centers (608, 610, 612), covariance matrix values or normalization factors for the Mahalanobis distance metric. In addition, to support the pattern score update learning 304 either all training samples or some intermediate results will be stored. For example in the distance to center model, the feature sum and feature sum of square can be stored for each pattern type to facilitate incremental model parameter update. The storage of the additional data for recipe update can be made as an optional step and the additional data only need to be retrieved during the update teaching process.

IV. Update Teaching

During the update teaching, the additional pattern labeling 302 can be performed using a computer GUI where regions of interest 104 are displayed and user can perform labeling by simple clicking at the regions where pattern scores 204 are incorrect. The additional 370 teaching samples and additional region pattern labels 304 are used to update the original (current) pattern score recipe 114. The pattern score update learning 304 includes a pattern scoring model update learning step using region features 108, additional region pattern labels 304 and the pattern score recipe 114 to generate updated pattern scoring model output. This is followed by a pattern scoring model update storage step using the updated pattern scoring model to generate updated pattern score recipe output 306.

In one embodiment of the invention, the original teaching data is stored in the pattern score recipe 114. In this case, the pattern scoring model update learning could be done with the same procedure as the pattern scoring model learning 404 with the original and the additional data. In case that only intermediate results are stored, the incremental update rules could be applied. For example, the feature sum and feature sum of square can be incrementally updated without the original teaching data. The updated cluster centers and distance normalization factors can then be derived from the updated feature sum and feature sum of square.

The pattern scoring model update storage step can be performed with the same procedure as the pattern scoring model storage method 408.

V. Application Phase

During the application phase, the pattern score recipe 114 can be used on new sample derived from the at least one application image 200 to calculate the pattern scores 204. The pattern scores 204 along with the region features 108 are processed by a region classification step 206 to output region classes 208 for the detected regions of interest 104. In one embodiment of the invention, the decision tree classifier can be used for region classification (see Lee JSJ, et. al., Regulation of hierarchic decisions in intelligent systems, U.S. Pat. No. 7,031,948, Apr. 18, 2006.)

Those ordinary skilled in the art should recognize that other pattern classification methods such as artificial neural networks, support vector machines, nearest neighbor classifier, Bayes linear, Bayes quadratic, Fishers' linear classifiers, etc. can also be used for region classification. They are all within the scope of this invention.

The invention has been described herein in considerable detail in order to comply with the Patent Statutes and to provide those skilled in the art with the information needed to apply the novel principles and to construct and use such specialized components as are required. However, it is to be understood that the inventions can be carried out by specifically different equipment and devices, and that various modifications, both as to the equipment details and operating procedures, can be accomplished without departing from the scope of the invention itself.

What is claimed is:

1. A computerized teachable pattern scoring method for segmented object region comprising the steps of:
    a) Input a teaching image;
    b) Perform region segmentation using the teaching image to generate regions of interest output;
    c) Perform region feature measurement using the teaching image and the regions of interest to generate region features output wherein the region features are generated for each region of interest and a region of interest has a same region feature value;
    d) Input region pattern labels;
    e) Perform pattern score learning using the region features and the region pattern labels to generate region based pattern score recipe output wherein the pattern score recipe contains instructions for a computer to generate a pattern score wherein the pattern score is a distance metric with a normalization factor and wherein a region of interest has a same pattern score value.

2. The computerized teachable pattern scoring method of claim 1 wherein the region pattern labels is generated by the following steps:
   a) Perform pattern type specification by user to generate pattern types;
   b) Perform region labeling by user to generate region pattern labels.

3. The computerized teachable pattern scoring method of claim 1 wherein the pattern score learning comprises the steps of:
   a) Perform pattern scoring model learning using the region features and the region pattern labels to generate pattern scoring model output;
   b) Perform pattern scoring model storage using the pattern scoring model to generate pattern score recipe output.

4. The pattern score learning of claim 3 further comprises a feature selection step using the region pattern labels and region features to generate selected features output.

5. The pattern score learning of claim 3 wherein the pattern scoring model is selected from a set consists of distance to center model, multiple cluster centers model and kernel based model.

6. A computerized update teaching of a teachable pattern scoring method for segmented object region comprising the steps of:
   a) Input a validation image;
   b) Perform region segmentation using the validation image to generate regions of interest output;
   c) Perform region feature measurement using the validation image and the regions of interest to generate region features output wherein the region features are generated for each region of interest and a region of interest has a same region feature value;
   d) Input pattern score recipe;
   e) Perform pattern scoring using the region features and the pattern score recipe to generate region based pattern scores output wherein a region of interest has a same pattern score value;
   f) Perform additional pattern labeling using the region based pattern scores to generate additional region pattern labels output;
   g) Perform pattern score update learning using the region features, the additional region pattern labels and the pattern score recipe to generate updated pattern score recipe output wherein the updated pattern score recipe contains instructions for a computer to generate a pattern score wherein the pattern score is a distance metric with a normalization factor.

7. The computerized update teaching method of claim 6 wherein the additional region pattern labels is performed using a computer GUI wherein regions of interest are displayed and user can perform labeling by simple clicking at regions where pattern scores are incorrect.

8. The computerized update teaching method of claim 6 wherein the pattern score update learning comprises the steps of:
   a) Perform pattern scoring model update learning using region features, additional region pattern labels and the pattern score recipe to generate updated pattern scoring model output;
   b) Perform pattern scoring model update storage step using the updated pattern scoring model to generate updated pattern score recipe output.

9. The pattern score learning of claim 8 wherein the pattern scoring model is selected from a set consists of distance to center model, multiple cluster centers model and kernel based model.

10. A computerized region classification method based on teachable pattern scoring comprising the steps of:
    a) Input at least one application image;
    b) Perform region segmentation using the application image to generate regions of interest output;
    c) Perform region feature measurement using the application image and the regions of interest to generate region features output wherein the region features are generated for each region of interest and a region of interest has a same region feature value;
    d) Input pattern score recipe wherein the pattern score recipe contains instructions for a computer to generate a pattern score;
    e) Perform pattern scoring using the region features and the pattern score recipe to generate region based pattern scores output wherein the region based pattern scores are distance metrics with normalization factors and wherein a region of interest has a same pattern score value;
    f) Perform region classification using the region based pattern scores and region features to generate region class output wherein a region of interest has a same pattern class value.

11. The region classification method of claim 10 wherein the region segmentation method is a learnable object segmentation.

12. The region classification method of claim 10 wherein the region features include morphological features, intensity features and texture and contextual features.

13. The region classification method of claim 10 wherein the pattern scoring generates pattern scores using distance metric to different pattern types.

14. The region classification method of claim 10 wherein the region classification using decision tree classifier.

15. The region classification method of claim 13 wherein the distance metric uses Mahalanobis distance.

* * * * *